(12) United States Patent
Wagner (10) Patent No.: US 10,549,366 B2
(45) Date of Patent: Feb. 4, 2020

(54) WHIRLING TOOL (71) Applicant: Hartmetall-Werkzeugfabrik Paul Horn GmbH, Tuebingen (DE)

(72) Inventor: Eckhard Wagner, Moessingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 15/911,447

(22) Filed: Mar. 5, 2018

(65) Prior Publication Data
US 2018/0193934 A1  Jul. 12, 2018

Related U.S. Application Data

(63) Continuation of application No. PCT/EP2016/070452, filed on Aug. 31, 2016.

(30) Foreign Application Priority Data

Sep. 10, 2015 (DE) .................. 10 2015 115 310

(51) Int. Cl.
*B23G 1/34* (2006.01)
*B23C 5/08* (2006.01)
*B23G 5/18* (2006.01)

(52) U.S. Cl.
CPC .................. *B23G 1/34* (2013.01); *B23C 5/08* (2013.01); *B23G 5/18* (2013.01);
(Continued)

(58) Field of Classification Search
CPC ........ B23G 1/34; B23G 5/18; B23G 2240/60; B23C 5/08; B23C 2210/503; B23C 2220/68

See application file for complete search history.

(56) References Cited

U.S. PATENT DOCUMENTS 4,640,159 A * 2/1987 Stojanovski ............ B23B 27/00
74/826
4,674,923 A * 6/1987 Ogilvie ..................... B23C 5/12
144/237
(Continued)

FOREIGN PATENT DOCUMENTS

CN  102665583 A   9/2012
CN  203992686 U  12/2014
(Continued)

OTHER PUBLICATIONS

International Search Report for International Application No. PCT/EP2016/070452, dated Nov. 15, 2016.
(Continued)

*Primary Examiner* — Sara Addisu
(74) *Attorney, Agent, or Firm* — Jason H. Vick; Sheridan Ross, PC (57) ABSTRACT

A whirling tool for machining a workpiece, having: three or a multiple of three cutting plates, wherein each of the cutting plates comprises at least one cutting edge; a cutting plate holder having a plurality of cutting plate receptacles, wherein each of the cutting plate receptacles is configured to receive one of the cutting plates, wherein the cutting plate receptacles are disposed so as to be distributed in a circumferential direction across the cutting plate holder; and a plurality of fastening elements for releasably fastening the cutting plates in the cutting plate receptacles of the cutting plate holder; wherein the cutting plates comprise at least two different kinds of cutting plates, wherein at least one cutting plate of a first kind, and one cutting plate of a second kind are provided for each group of three cutting plates that are disposed beside one another on the cutting plate holder, wherein the cutting plate of the first kind differs from the cutting plate of the second kind by an overall geometry, by
(Continued)

a dimension of the at least one cutting edge, and by a shape of the at least one cutting edge.

12 Claims, 4 Drawing Sheets

(52) U.S. Cl.
CPC .... *B23C 2210/503* (2013.01); *B23C 2220/68* (2013.01); *B23G 2240/60* (2013.01)

(56) References Cited

U.S. PATENT DOCUMENTS

| | | | | |
|---|---|---|---|---|
| 6,609,858 | B1* | 8/2003 | Francis | B23F 21/226 407/113 |
| 6,901,642 | B2* | 6/2005 | Rydberg | B23B 29/24 29/27 C |
| 7,121,176 | B2* | 10/2006 | Pinger | B23B 29/242 82/1.11 |
| 2004/0081519 | A1* | 4/2004 | Gainer | B23G 1/34 407/49 |
| 2008/0069648 | A1* | 3/2008 | Macario | B23G 1/34 407/33 |
| 2010/0183384 | A1* | 7/2010 | Kruszynski | B23D 77/02 407/67 |
| 2011/0311327 | A1* | 12/2011 | Harif | B23C 5/109 407/42 |
| 2012/0264528 | A1 | 10/2012 | Isobe et al. | |
| 2017/0066066 | A1* | 3/2017 | Serbutovsky | B23C 5/2458 |

FOREIGN PATENT DOCUMENTS

| | | |
|---|---|---|
| DE | 2945611 A1 | 10/1980 |
| DE | 3532282 A1 | 3/1987 |
| DE | 19929068 A1 | 12/2000 |
| EP | 1902804 A2 | 3/2008 |
| JP | H10-058233 A | 3/1998 |
| JP | 2001-121351 A | 5/2001 |
| JP | 2008-073843 A | 4/2008 |
| JP | 2008-296331 | 12/2008 |
| RU | 76267 U1 | 9/2008 |
| SU | 568509 A1 | 8/1977 |
| SU | 650743 A | 3/1979 |
| SU | 768579 A1 | 10/1980 |

OTHER PUBLICATIONS

Written Opinion for International Application No. PCT/EP2016/070452, dated Nov. 15, 2016.
Office Action (including translation) for corresponding Russian Application No. 2018112523/02(019647), dated Jan. 30, 2019.
International Preliminary Report on Patentability for International Application No. PCT/EP2016/070452, dated Mar. 22, 2018.
Decision to Grant a Patent (Including Translation) for corresponding Japanese Patent Application No. 2018-512905, dated Jul. 9, 2019.
NTK Cutting Tools "General Catalog" USA; K145-K146; Sep. 30, 2014.
Notice of Reason for Rejection (Including Translation) for corresponding Japanese Patent Application No. 2018-512905, dated Mar. 5, 2019.
Decision to Grant a Patent for an Invention for corresponding Russian Application No. 2018112523/02(019647), dated Jun. 13, 2019.

* cited by examiner

WHIRLING TOOL

CROSS REFERENCES TO RELATED APPLICATIONS

This application is a continuation of international patent application PCT/EP2016/070452, filed on Aug. 31, 2016 designating the U.S., which international patent application has been published in German language and claims priority from German patent application DE 10 2015 115 310.6, filed on Sep. 10, 2015. The entire contents of these priority applications are incorporated herein by reference.

BACKGROUND OF THE INVENTION

This disclosure relates to a whirling tool for machining a workpiece. This disclosure relates in particular to a whirling tool having replaceable cutting plates. This whirling tool is suitable in particular for thread whirling.

Whirling is a metal-cutting manufacturing method which in terms of the tool and in terms of the kinetics represents a special form of screw milling. Whirling serves in particular for producing threads, however can also be generally used for producing rotationally symmetrical parts such as, for example, worms, screws, or rotors.

By virtue of the high performance capability of this metal-cutting manufacturing method, whirling is suitable in particular for machining workpieces from tough materials such as titanium or precious metal. For this reason, the majority of all bone screws today are produced by thread whirling, for example.

It is a characteristic of whirling that both the whirling tool as well as the workpiece are rotated. The whirling tool which determines the cutting speed, orbits in an eccentrically positioned manner at a high rotational speed about the slowly rotating workpiece. The feed rate of the workpiece along the longitudinal axis of the latter is set according to the desired thread pitch to be produced. Moreover, the whirling tool, depending on the desired thread pitch, is pivoted about the x-axis of said whirling tool. The radial infeed of the whirling tool in relation to the workpiece establishes the depth of the thread.

By virtue of the eccentric positioning of the workpiece in relation to the whirling tool, relatively short chips are formed. This has an advantageous effect on the surface quality of the machined workpiece.

A difference is made between external whirling and internal whirling. External whirling typically serves for producing external threads, whereas internal whirling typically serves for producing internal threads. The cutting edges in the case of external whirling are directed inward, wherein the whirling tool rotates about the workpiece. Therefore, external whirling is in some instances also referred to as milling by milling cutting edges with internal teeth. In contrast, the cutting edges in the case of internal whirling are directed outward. The whirling tool herein rotates within a bore of the workpiece. The principle of the eccentric whirling movement of the tool and of the simultaneous movement of the workpiece (both rotating as well as in the longitudinal direction) in the case of external and internal whirling is otherwise identical.

A problem which can be determined in the case of whirling tools is the relatively high wear on the used cutters or cutting edges, respectively. This in many instances leads to relatively short service lives. The cutting plates have to be replaced often in the case of whirling tools having replaceable cutting plates. This in turn ultimately leads to increased production costs.

SUMMARY OF THE INVENTION

It is an object to provide a whirling tool for machining a workpiece, in which the wear on the cutting edges used is reduced such that the service lives can be increased.

In view of this object, a whirling tool for machining a workpiece is presented, having;
  three cutting, wherein each of the cutting plates comprises a cutting edge;
  a cutting plate holder having three cutting plate receptacles, wherein each of the cutting plate receptacles is configured to receive one of the cutting plates, wherein the cutting plate receptacles are disposed so as to be distributed in a circumferential direction across the cutting plate holder; and
  three fastening elements, wherein each of the three fastening elements is configured to fasten one of the cutting plates in one of the cutting plate receptacles of the cutting plate holder;
wherein the three cutting plates are disposed beside one another on the cutting plate holder, form a first group of cutting plates, and comprise two cutting plates of a first kind and one cutting plate of a second kind, wherein a first one of the two cutting plates of the first kind is disposed on the cutting plate holder between a second one of the two cutting plates of the first kind and the cutting plate of the second kind, wherein the two cutting plates of the first kind differ from the cutting plate of the second kind by an overall geometry and by a shape of the cutting edge.

According to a refinement, the whirling tool comprises a second group of cutting plates comprising three further cutting plates which are disposed beside one another on the cutting plate holder in three further cutting plate receptacles and fastened to the cutting plate holder by three further fastening elements, wherein said second group of cutting plates comprises two cutting plates of the first kind and one cutting plate of the second kind, wherein a first one of the two cutting plates of the first kind of said second group is disposed on the cutting plate holder between a second one of the two cutting plates of the first kind of said second group and the cutting plate of the second kind of said second group, and wherein the cutting plate of the second kind of said second group is arranged on the cutting plate holder beside the second one of the two cutting plates of the first kind of said first group.

According to a further refinement, the whirling tool comprises six further cutting plates which are disposed beside one another on the cutting plate holder in six further cutting plate receptacles, and fastened to the cutting plate holder by six further fastening elements, wherein three of said six further cutting plates form a second group of cutting plates and the other three of said six further cutting plates form a third group of cutting plates, wherein each of said second and third group of cutting plates comprises two cutting plates of the first kind and one cutting plate of the second kind, wherein a first one of the two cutting plates of the first kind of said second group is disposed on the cutting plate holder between a second one of the two cutting plates of the first kind of said second group and the cutting plate of the second kind of said second group, wherein a first one of the two cutting plates of the first kind of said third group is disposed on the cutting plate holder between a second one of the two cutting plates of the first kind of said third group and the cutting plate of the second kind of said third group, wherein the cutting plate of the second kind of said second group is arranged on the cutting plate holder beside the second one of the two cutting plates of the first kind of said first group, and wherein the cutting plate of the second kind of third group is arranged on the cutting plate holder beside the second one of the two cutting plates of the first kind of said second group.

According to a still further refinement, the cutting plate of the second kind of said first second group is arranged on the cutting plate holder beside the second one of the two cutting plates of the first kind of said third group In other words, the whirling tool comprises:
three or a multiple of three cutting plates, wherein each of the cutting plates comprises at least one cutting edge;
a cutting plate holder having a plurality of cutting plate receptacles, wherein each of the cutting plate receptacles is configured to receive one of the cutting plates, wherein the cutting plate receptacles are disposed so as to be distributed in a circumferential direction across the cutting plate holder; and
a plurality of fastening elements for releasably fastening the cutting plates in the cutting plate receptacles of the cutting plate holder;
wherein the cutting plates comprise two different kinds of cutting plates, wherein each group of three of the cutting plates that are disposed beside one another on the cutting plate holder comprises two cutting plates of a first kind and one cutting plate of a second kind, wherein one of the two cutting plates of the first kind is disposed on the cutting plate holder between the other one of the two cutting plates of the first kind and the cutting plate of the second kind, wherein the two cutting plates of the first kind differ from the cutting plate of the second kind by an overall geometry, by a dimension of the at least one cutting edge, and by a shape of the at least one cutting edge.

The whirling tool according to the disclosure comprises three cutting plates or a multiple of three cutting plates. The tool particularly preferably comprises precisely 6, precisely 9, or precisely twelve cutting plates. These cutting plates are attached so as to be replaceable on a cutting plate holder. The cutting plates are disposed so as to be distributed in the circumferential direction on the cutting plate holder and are preferably mutually spaced apart. A particularly characteristic feature of the whirling tool according to the disclosure is the use of at least two different kinds of cutting plates which differ either in the overall geometry (dimension and/or shape) thereof, and/or in the dimension and/or shape of the cutting edges. It is in particular provided according to the disclosure herein that for each group of three cutting plates that are disposed beside one another on the cutting plate holder at least one cutting plate of the first kind and one cutting plate of the second kind are used.

The term "cutting plates disposed beside one another on the cutting plate holder" is presently to be understood to mean cutting plates which in the assembled state of the whirling tool are directly sequential when viewed in the circumferential direction. "Directly" herein is not to imply that the cutting plates that in the circumferential direction are sequential have to contact one another. Cutting plates that are disposed beside one another can in principle indeed be in mutual contact, however, said cutting plates are preferably mutually spaced apart. In other words, "cutting plates that are disposed beside one another" are presently understood to mean such cutting plates which are disposed so as to be direct neighbors to one another on the cutting plate holder. In terms of the whirling tool according to the disclosure which comprises three or a multiple of three cutting plates, this thus means that each of the cutting plates together with its two neighboring cutting plates (left and right) form one group of three cutting plates, of which at least one cutting plate is a cutting plate of the first kind and one cutting plate is a cutting plate of the second kind.

The use of different kinds of cutting plates has proven advantageous in particular in terms of the overall wear thereon. By virtue of the different overall geometries, or of the different geometries of the cutting edges, respectively, the cutting plates of the first kind in the machining of the workpiece assume another function than the cutting plates of the second kind. The cutting plates of the second kind, for example due to the shape thereof, can be conceived for the preliminary cutting or roughing, respectively, while the cutting plates of the first kind have contour-imparting cutting edges which are responsible for the production of the final threaded profile. In this way, the cutting plates of the second kind are stressed in a comparatively heavy manner and subtract a relatively large quantity of material, whereas the cutting plates of the first kind are stressed to a lesser extent and form "only" the details of the contour that is to be represented on the workpiece. This indeed leads to an overall situation in which the cutting plates of the second kind wear more rapidly when compared to the cutting plates of the first kind. This, however, is acceptable, indeed even advantageous, since the ultimately contour-imparting cutting edges of the cutting plates of the first kind are subject to less wear. In such a case, an at least partially worn-out cutting edge of the cutting plates of the second kind can in some instances even remain undetected (as long as the cutting edges of the cutting plates of the first kind are not also worn-out), since the former has no or only a very minor effect on the surface quality on the workpiece.

It is particularly preferable herein that the cutting plates of the first kind and the cutting plates of the second kind are not always disposed in an alternating manner on the cutting plate holder, but that each cutting plate of the first kind is disposed on the cutting plate holder between one other cutting plate of the first kind and one cutting plate of the second kind. If the cutting plates of the first kind for the sake of simplicity are referred to as "A" and the cutting plates of the second kind as "B", the following arrangement on the cutting plate holder thus results: AABAAB . . . (When viewed sequentially in the circumferential direction).

Following the example above, that the cutting plates of the second kind are used for preliminary cutting, subtracting material, or roughing, respectively, and the cutting plates of the first kind are used for producing the threaded profile, in the case of the last-mentioned refinement one of three cutting plates assume in each case the task of roughing or material subtraction, respectively, and two of three cutting plates assume the production of the final threaded profile. A cutting plate of the first kind which in the machining of the workpiece in the circumferential direction and thus also in the rotation direction of the whirling tool contacts the workpiece after a cutting plate of the second kind and after one other cutting plate of the first kind is therefore stressed to a relatively minor extent.

According to a further refinement, each cutting plate has one main body and at least one cutting body which is integrally connected to the main body and which projects from the main body and on which the at least one cutting edge of the cutting plate is disposed, wherein the respective at least one cutting body of the cutting plates of the first kind has a larger volume than the respective at least one cutting body of the cutting plates of the second kind.

Both the cutting plates of the first kind, as well as the cutting plates of the second kind, preferably each have two cutting bodies which are disposed on opposite ends of the main body. The two cutting bodies of the cutting plates of the first kind are preferably identical. Likewise, the cutting bodies of the cutting plates of the second kind are preferably identical. The cutting bodies differ only among one another (first kind differing from the second kind), as mentioned. This results in that both the cutting plates of the first kind, as well as the cutting plates of the second kind, can be released from the cutting plate holder and can be reattached rotated by 180° to the cutting plate holder, without this changing the functional mode of the whirling tool described above.

While the principle mentioned above is capable of being used generally both in the case of external whirling tools as well as in the case of internal whirling tools, said principle in tests to date by the applicant has demonstrated to be particularly advantageous in particular in the case of external whirling tools. Accordingly, the cutting plate holder according to a refinement has a central through hole through which the workpiece during machining is guidable, wherein the cutting plates in the assembled state of the whirling tool project into the passage opening. each of the cutting plates (irrespective of the kind) projects into the passage opening by way of one cutting body of the preferably two cutting bodies of said cutting plates.

In a further refinement, the passage opening is designed so as to be symmetrical in relation to a longitudinal axis of the whirling tool, wherein the respective at least one cutting edge of the cutting plates of the first kind in the assembled state of the whirling tool project further into the passage opening and have a smaller spacing from the longitudinal axis than the respective at least one cutting edge of the cutting plates of the second kind.

This leads to the situation already described, that the cutting plates of the first kind generate the details of the contour on the workpiece, and the cutting plates of the second kind are used for the preliminary cutting of the threaded profile. Therefore, the at least one cutting edge of the cutting plate of the first kind preferably has a more multi-faceted contour than the respective at least one cutting edge of the cutting plates of the second kind. A "more multifaceted contour" is presently understood to be a contour of the cutting edge which, in relative terms, has a larger number of different curvatures or bends. Alternatively, it could also be said that the respective at least one cutting edge of the cutting plates of the first kind is preferably rather curved, and the respective at least one cutting edge of the cutting plates of the second kind is preferably rather linear or angular.

According to a further refinement, the cutting plate holder when viewed in the plan view along the longitudinal axis is substantially toroidal. The cutting plate holder can therefore be inserted into a substantially cylindrical main holder which is capable of being coupled to a tool driving spindle.

According to a further refinement, the respective at least one cutting body of the cutting plates of the first kind at a frontal end which in the assembled state of the whirling tool projects into the passage opening has a smaller height than the respective at least one cutting body of the cutting plates of the second kind, wherein the height is measured parallel with the longitudinal axis of the whirling tool. This additionally de-stresses the cutting plates of the first kind, on account of which the wear on the latter is reduced.

According to a further refinement, each of the cutting plate receptacles has a planar bearing face which runs so as to be transverse, preferably orthogonal, to the longitudinal axis of the whirling tool, and two mutually spaced apart bearing faces which run so as to be orthogonal to the bearing face, the normal vectors of said contact faces enclosing an acute angle. On account thereof, a stable plate seat results for each of the cutting plates that are disposed in the cutting plate holder.

According to a further preferred refinement, the fastening elements have clamp screws which engage in respective threads which are provided in the cutting plate holder, wherein the central axes of the threads are all spaced so as to be equidistant from the central longitudinal axis of the whirling tool. The centers of the threads lie on a common circle, so to speak.

It is to be understood that the features mentioned above and yet to be explained hereunder are capable to be used not only in the combination stated in each case, but also in other combinations or individually, without departing from the spirit and scope of the present disclosure.

DESCRIPTION OF PREFERRED EMBODIMENTS

Figure 1:
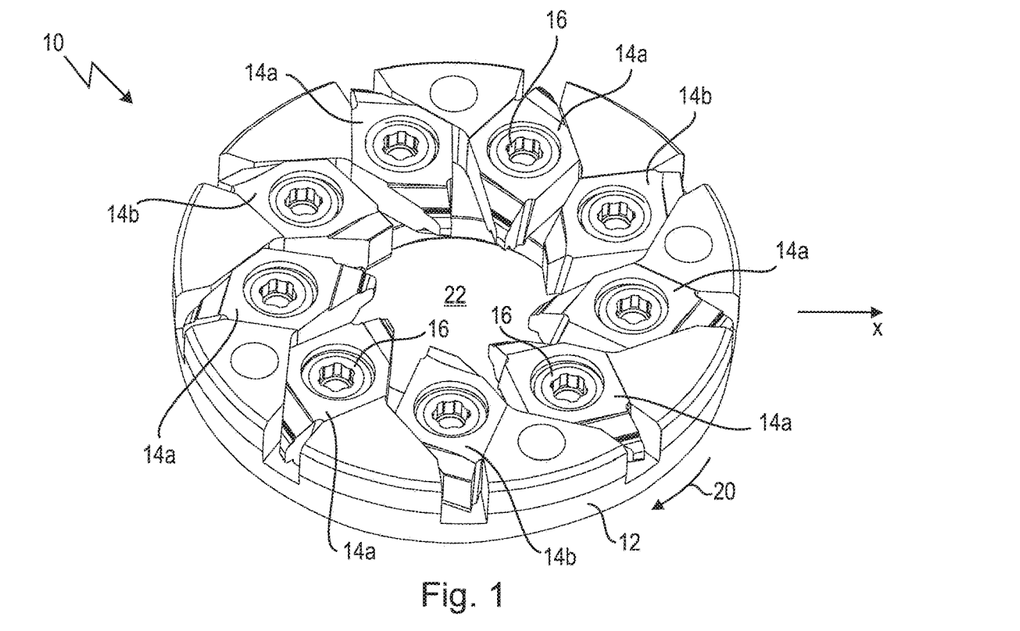
FIG. 1 shows a perspective view of an exemplary embodiment of the whirling tool.
Figure 2:
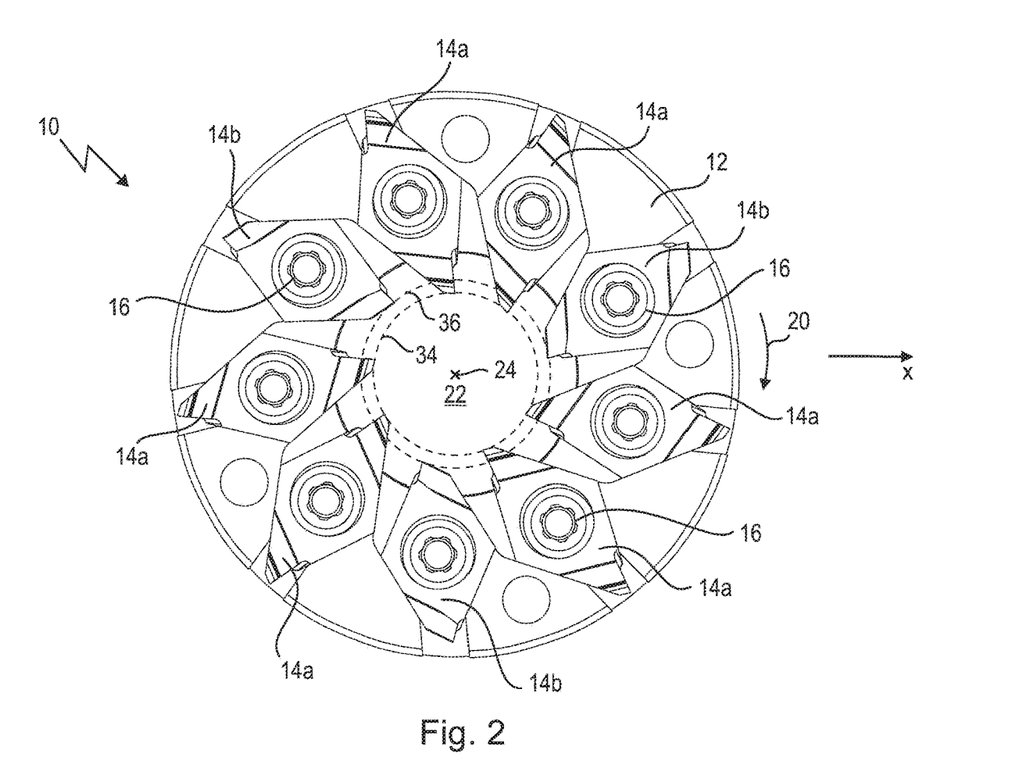
FIG. 2 shows a plan view from above of the exemplary embodiment of the whirling tool shown in FIG. 1.
Figure 3:
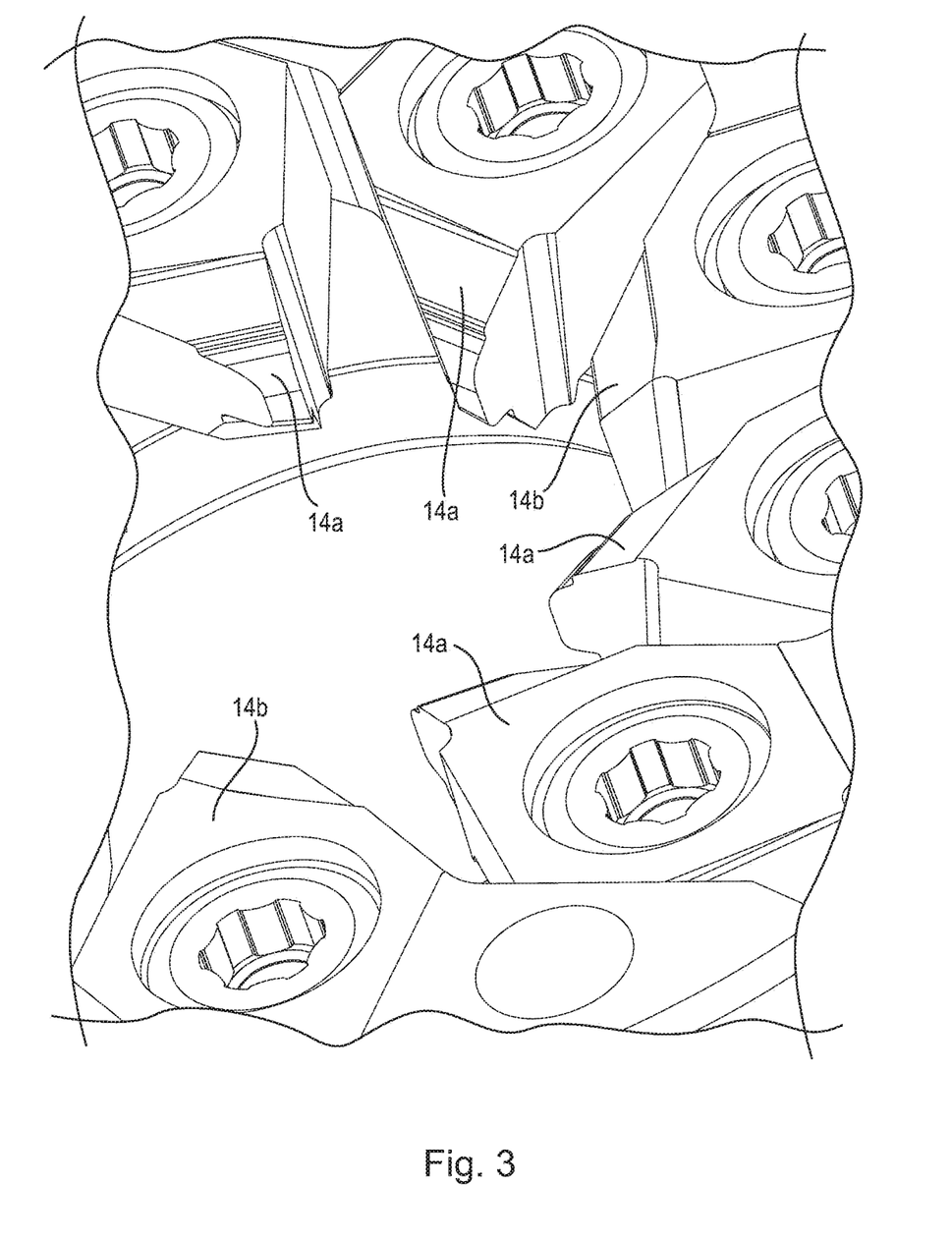
FIG. 3 shows a detailed view of the exemplary embodiment of the whirling tool shown in FIG. 1.

FIGS. 1 to 3 show an exemplary embodiment of the whirling tool in a perspective view, in a plan view from above, and in a detailed view. The whirling tool therein, in its entirety, is identified by the reference sign 10.

Figure 4:
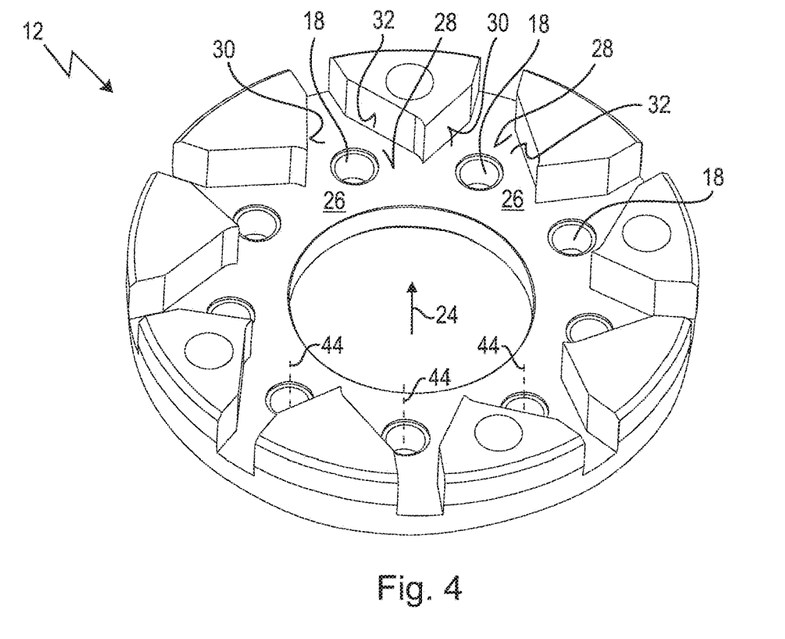
FIG. 4 shows a perspective view of a cutting plate holder of the whirling tool according to the exemplary embodiment shown in FIG. 1.
Figure 5:
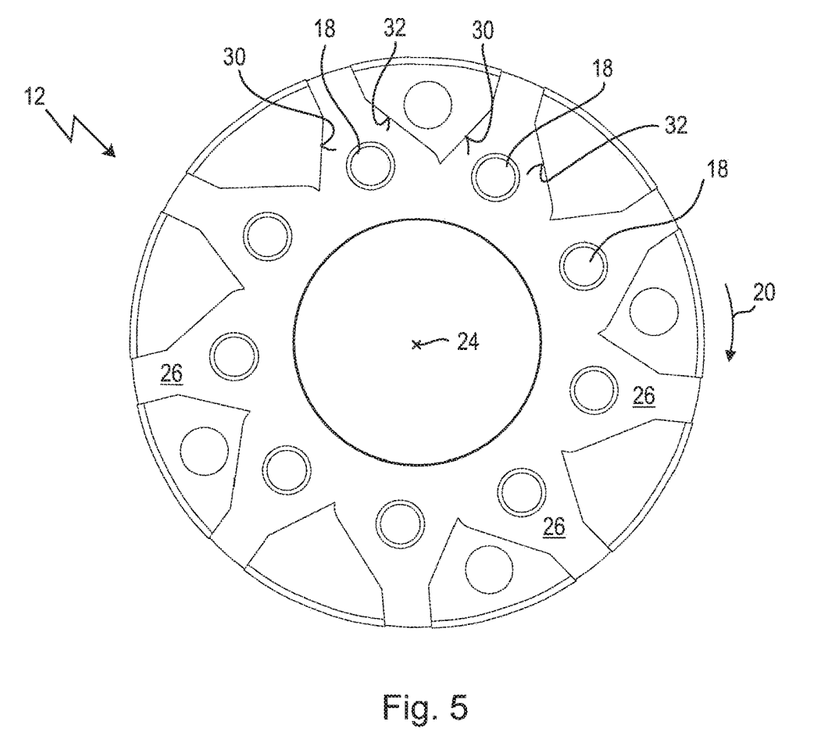
FIG. 5 shows a plan view from above of the cutting plate holder shown in FIG. 4.

The whirling tool 10 comprises a cutting plate holder 12 on which a plurality of cutting plates 14*a*, 14*b* are releasably fastened with the aid of fastening elements 16. The cutting plates 14*a*, 14*b* are preferably reversible cutting plates from hard metal. The fastening elements 16 are preferably implemented as clamp screws which engage in respective threads 18 which are provided in the cutting plate holder 12 (cf. FIGS. 4 and 5). The clamp screws 16 are preferably provided with a Torx tool engagement or a hexagonal socket tool engagement, while in principle any kinds of tool engagements can be considered. The cutting plate holder 12 is preferably produced from steel. Said cutting plate holder 12 can be constructed so as to be integral (from a single integral component) or in multiple parts (from a plurality of interconnected components).

The whirling tool 10 according to the exemplary embodiment shown here has a total of nine cutting plates 14*a*, 14*b* which are disposed so as to be disposed in the circumferential direction 20 on the cutting plate holder 12. In alternative exemplary embodiments of the whirling tool 10, for example 3, 6, or 12 cutting plates 14*a*, 14*b* can also be provided instead of nine cutting plates 14a, 14b, without departing from the spirit and scope of the present disclosure.

The whirling tool 10 in the exemplary embodiment shown is embodied as an external whirling tool. External whirling tools of this kind serve in particular for producing external threads.

The whirling tool 10 is usually driven at relatively high rotational speeds in the circumferential direction 20. In order for the cutting plane of the tool cutting edges to be set, or in order for the thread pitch to be set, respectively, the cutting plate holder 12 during the rotation thereof is tilted relative to the workpiece by a desired angle about the x-axis of said cutting plate holder 12. The workpiece (not illustrated) likewise rotates about the longitudinal axis thereof, however at a substantially lower rotational speed than the whirling tool 10. During machining, the workpiece is pushed along the longitudinal direction thereof through the passage opening 22 that is provided so as to be central in the cutting plate holder 12. However, the workpiece during this feed movement is not positioned in a centric, but an eccentric or out-of-center manner, respectively, in the passage opening 22 of the whirling tool 10. The kinematics typical of whirling results on account thereof. By virtue of the eccentric and tilted arrangement of the whirling tool 10 relative to the workpiece, it is in particular typical herein that, as opposed to circular milling, for example, not all cutting plates 14a, 14b engage simultaneously on the workpiece but only some or even only one of the cutting plates 14a 14b engage on the workpiece at any momentary point in time. The cutting plates 14a, 14b thus contact the workpiece in a temporally sequential manner.

In a manner typical for such an external whirling tool, the cutting plate holder 12 for the aforementioned reasons therefore has a central through hole 22 through which the workpiece is guidable during machining. This passage opening 22 is preferably symmetrical to the longitudinal axis 24 of the whirling tool 10. The passage opening 22 in the present exemplary embodiment is designed so as to be cylindrical. However, this is not mandatory. Other shapes are also conceivable in principle. However, the cutting plate holder 12 is not necessarily symmetrical to the longitudinal axis 24, as can also be derived from the exemplary embodiment illustrated.

Each of the cutting plates 14a, 14b is disposed individually in cutting plate receptacles 26 that are provided therefor on the cutting plate holder 12. Each of these cutting plate receptacles 26 has a planar bearing face 28 and two mutually spaced apart contact faces 30, 32 (cf. FIGS. 4 and 5). The bearing faces 28 of the individual cutting plate receptacles 26 preferably transition into one another, as can be seen from FIGS. 4 and 5. Said bearing faces 28 are thus aligned so as to be mutually coplanar and preferably so as to be orthogonal to the longitudinal axis 24 of the whirling tool 10. The two contact faces 30, 32, however, are aligned so as to be preferably parallel with the longitudinal axis 24, thus orthogonal to the bearing face 28. The two contact faces 30, 32 of each cutting plate receptacle 26 in the exemplary embodiment shown are mutually aligned at an acute angle. This enables a stable seat of the cutting plates 14a, 14b in the cutting plate receptacles 26.

The cutting plates 14, 14b in the assembled state of the whirling tool 10 project into the passage opening 22 of the cutting plate holder 12 (cf. in particular FIG. 2). Since not only cutting plates of a single type, but cutting plates 14a, 14b of at least two different types are used, said cutting plates 14a, 14b project dissimilarly far into the passage opening 22 of the cutting plate holder 12. Different orbits 34, 36 of the cutting plates 14a, 14b, or of the cutting edges of the latter, respectively, result therefrom.

Figure 6:
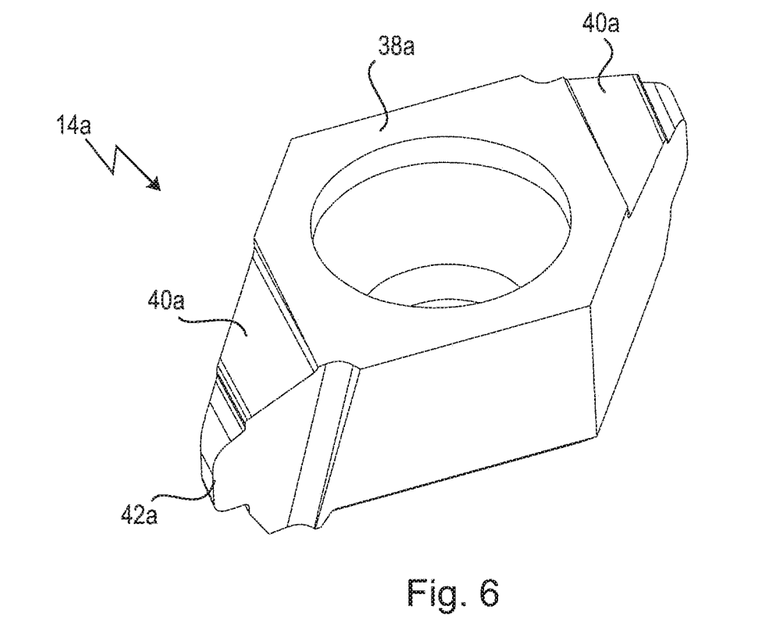
FIG. 6 shows an exemplary embodiment of a cutting plate of a first kind, used in the whirling tool.
Figure 7:
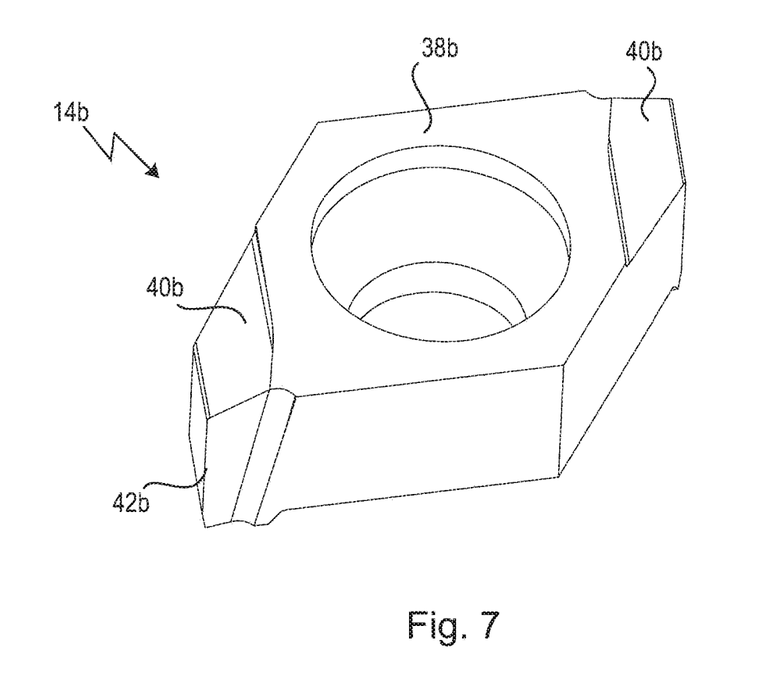
FIG. 7 shows an exemplary embodiment of a cutting plate of a second kind, used in the whirling tool.

Two different kinds of cutting plates are used in the present exemplary embodiment, one cutting plate 14a of a first kind, or of a first type, respectively (cf. FIG. 6 for details), and one cutting plate 14b of a second kind, or of a second type, respectively (cf. FIG. 7 for details).

The two different kinds of cutting plates 14a, 14b differ from one another by the overall geometry thereof (dimensional and/or shape) and by the dimension and/or shape of the cutting edges thereof. Said cutting plates 14a, 14b thus also differ in terms of the function thereof. The cutting plates 14a of the first kind are used in particular for imparting the contour, or for finishing the threaded profile to be produced. In contrast, the cutting plates 14b of the second kind are mainly used for roughing (subtracting material), or for the preliminary cutting of the threaded profile to be produced, respectively.

Both cutting plate types 14a, 14b have a main body 38a or 38b, respectively, and two cutting bodies 40a or 40b, respectively, which project from the main body 38a or 38b, respectively, and which are integrally connected to the latter. The main body 38a of the cutting plates 14a of the first kind does not differ at all or only to a minor extent (at the transition toward the cutting bodies) from the main body 38b of the cutting plates 14b of the second kind. The substantial difference between the two cutting plate types 14a, 14b lies in the different embodiment of the cutting body 40a, 40b.

The cutting bodies 40a of the cutting plates 14a of the first kind are preferably designed so as to be larger than the cutting bodies 40b of the cutting plates 14b of the second kind, or have a larger volume than the latter, respectively. The cutting bodies 40a of the cutting plates 14a of the first kind are mainly designed so as to be deeper than the cutting bodies 40b of the cutting plates 14b of the second kind. The term "deeper" is presently to be understood that the frontal end of the cutting bodies 40a of the cutting plates 14a of the first kind have a larger spacing from the main body 38a than the frontal end of the cutting body 40b of the cutting plates 14b of the second kind. Therefore, the cutting edges 42a of the cutting plates 14a of the first kind in the assembled state of the whirling tool 10 project further into the passage opening 22 of the cutting plate holder 12 than the cutting plates 14b of the second kind (cf. FIG. 2). The orbit 34 of the cutting edges 42a of the cutting plates 14a is therefore smaller, that is to say has a smaller diameter, than the orbit 36 of the cutting plates 14b. Instead, the cutting bodies 40b of the cutting plates 14b of the second kind in particular in the region of the frontal end of the cutting body 40b are designed so as to be higher than the cutting bodies 40a of the cutting plates 14a of the first kind. The height of the cutting plates 14a, 14b, or of the cutting bodies 40a, 40b thereof, respectively, is understood to be the dimension of said cutting plates or cutting bodies which in the installed state is measured parallel with the longitudinal axis 24.

The cutting plates 14a, 14b are preferably not always disposed in an alternating manner on the cutting plate holder 12, but in (imaginary) groups of three cutting plates, wherein each group of three cutting plates comprises two cutting plates 14a of the first kind and one cutting plate 14b of the second kind. In other words, each cutting plate 14a of the first kind is disposed on the cutting plate holder 12 between one other cutting plate 14a of the first kind and one cutting plate 14b of the second kind. The cutting plates 14b of the second kind thus cut the threaded segments in a preliminary manner, and the two cutting plates 14a of the first kind that directly follow in the rotation direction 20 of the whirling tool 10 complete the cutting of the threaded segments and finish the threaded profile. In particular that cutting plate 14a that is the next but one to follow each cutting plate 14b in the rotation direction 20 is stressed the least, on account thereof. The wear on said cutting plate 14a is thus less than the wear on the cutting plates 14b. However, since said cutting plates 14a impart the actual contour of the thread to be produced, relatively positive machining results can still be achieved also in the case of wear on the cutting plates 14b and on the cutting plates 14a that in the rotation direction 20 directly follow the cutting plates 14b. Any wear on the cutting plates 14b and on the cutting plates 14a that in the rotation direction 20 directly follow the latter can therefore be readily accepted without this leading to the surface quality on the thread to be produced being perceivably compromised. An overall greater service life of all cutting plates 14a, 14b can thus be implemented.

It is finally to be noted that the principle of a plurality of different kinds of cutting plates as described above is also capable of being used in the case of an internal whirling tool. Instead of cutting plates 14a, 14b having in each case two cutting bodies 42a, 42b (so-called dual cutters), cutting plates having only one cutting body (so-called single cutters) or having more than two cutting bodies (for example, triple cutters or quadruple cutters) can also be used in principle without departing from the spirit and scope of the present disclosure. In principle, three different kinds of cutting plates can also be used. The geometric embodiment of the individual cutting edges 42a, 42b is likewise not restricted to the shape shown in the figures.

What is claimed is:

1. A whirling tool for machining a workpiece, having;
three cutting plates, wherein each of the cutting plates comprises a cutting edge;
a cutting plate holder having three cutting plate receptacles, wherein each of the cutting plate receptacles is configured to receive one of the cutting plates, wherein the cutting plate receptacles are disposed so as to be distributed in a circumferential direction across the cutting plate holder; and
three fastening elements, wherein each of the three fastening elements is configured to fasten one of the cutting plates in one of the cutting plate receptacles of the cutting plate holder;
wherein the three cutting plates are disposed beside one another on the cutting plate holder, form a first group of cutting plates, and comprise two cutting plates of a first kind and one cutting plate of a second kind, wherein a first one of the two cutting plates of the first kind is disposed on the cutting plate holder between a second one of the two cutting plates of the first kind and the cutting plate of the second kind, wherein the two cutting plates of the first kind differ from the cutting plate of the second kind by an overall geometry and by a shape of the cutting edge wherein the whirling tool further comprises six further cutting plates which are disposed beside one another on the cutting plate holder in six further cutting plate receptacles, and fastened to the cutting plate holder by six further fastening elements, wherein three of said six further cutting plates form a second group of cutting plates and the other three of said six further cutting plates comprises two cutting plates of the first kind and one cutting plate of the second kind, wherein a first one of the two cutting plates of the first kind of said second group is disposed on the cutting plate holder between a second one of the two cutting plates of the first kind of said second group and the cutting plate of the second kind of said second group, wherein a first one of the two cutting plates of the first kind of said third group is disposed on the cutting plate holder between a second one of the two cutting plates of the first kind of said third group and the cutting plate of the second kind of said third group, wherein the cutting plate of the second kind of said second group is arranged on the cutting plate holder beside the second one of the two cutting plates of the first kind of said first group, and wherein the cutting plate of the second kind of third group is arranged the cutting plate holder beside the second one of the two cutting plates of the first kind of said second group.

2. The whirling tool as claimed in claim 1, wherein the cutting plate of the second kind of said first second group is arranged on the cutting plate holder beside the second one of the two cutting plates of the first kind of said third group.

3. The whirling tool as claimed in claim 1, wherein each of the two cutting plates of the first kind comprises a first main body and a first cutting body which is integrally connected to the first main body, wherein the first cutting body projects from the first main body, and wherein the cutting edge of each of the two cutting plates of the first kind is disposed on the first cutting body of the respective one of the two cutting plates of the first kind, wherein the cutting plate of the second kind comprises a second main body and a second cutting body which is integrally connected to the second main body, wherein the second cutting body projects from the second main body, and wherein the cutting edge of the cutting plate of the second kind is disposed on the second cutting body, wherein the first cutting body has a larger volume than the second cutting body.

4. The whirling tool as claimed in claim 1, wherein the cutting plate holder has a central through hole, wherein the two cutting plates of the first kind and the cutting plate of the second kind in an assembled state of the whirling tool project into the through hole.

5. The whirling tool as claimed in claim 4, wherein the through hole is symmetrical with respect to a central longitudinal axis of the whirling tool, and wherein the cutting edge of each of the two cutting plates of the first kind in the assembled state of the whirling tool projects farther into the through hole and has a smaller distance from the central longitudinal axis than the cutting edge of the cutting plate of the second kind.

6. The whirling tool as claimed in claim 5, wherein the first cutting body of each of the two cutting plates of the first kind at a frontal end which in the assembled state of the whirling tool projects into the through hole has a smaller height than the second cut-ting body of the cutting plate of the second kind, said height being measured parallel to the central longitudinal axis.

7. The whirling tool as claimed in claim 6, wherein the cutting plate holder when viewed in a plan view along the central longitudinal axis is toroidal.

8. The whirling tool as claimed in claim 1, wherein the cutting edge of each of the two cutting plates of the first kind has a contour that is more multifaceted than the cutting edge of the cutting plate of the second kind.

9. The whirling tool as claimed in claim 1, wherein the cutting edge of each of the two cutting plates of the first kind is curved, and the cutting edge of the cutting plate of the second kind is linear or angular.

10. The whirling tool as claimed in claim 5, wherein each of the cutting plate receptacles has a planar bearing face which runs transverse to the central longitudinal axis of the whirling tool, and two mutually spaced apart contact faces which run orthogonal to the bearing face, said contact faces enclosing an acute angle.

11. The whirling tool as claimed in claim 1, wherein the cutting plate holder comprises three threads, wherein each of the three fastening elements engages in one of the three threads, wherein the three threads are spaced from one another and arranged equidistant from a central longitudinal axis of the whirling tool.

12. The whirling tool as claimed in claim 1, wherein the cutting plates are precisely 9 or 12 cutting plates.

\* \* \* \* \*